United States Patent
Enokihara

(10) Patent No.: US 10,265,645 B2
(45) Date of Patent: Apr. 23, 2019

(54) METHOD FOR PRODUCING ELECTRODE PASTE

(71) Applicant: Katsushi Enokihara, Toyota (JP)

(72) Inventor: Katsushi Enokihara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 513 days.

(21) Appl. No.: 14/431,343

(22) PCT Filed: Sep. 27, 2012

(86) PCT No.: PCT/JP2012/074946
§ 371 (c)(1),
(2) Date: Mar. 26, 2015

(87) PCT Pub. No.: WO2014/049788
PCT Pub. Date: Apr. 3, 2014

(65) Prior Publication Data
US 2015/0251109 A1    Sep. 10, 2015

(51) Int. Cl.
*B01D 19/00* (2006.01)
*B01D 19/02* (2006.01)
(Continued)

(52) U.S. Cl.
CPC ......... *B01D 19/02* (2013.01); *B01D 19/0036* (2013.01); *B29B 7/18* (2013.01);
(Continued)

(58) Field of Classification Search
CPC .. B29B 7/18; B29B 7/46; H01M 4/04; H01M 4/0483; H01M 4/139; H01M 4/20; B01D 19/00–19/0495
(Continued)

(56) References Cited

U.S. PATENT DOCUMENTS 4,900,308 A * 2/1990 Verkaart ................. A61M 5/36
604/126
6,600,000 B1 * 7/2003 Ooura ..................... C08F 14/06
524/323
(Continued)

FOREIGN PATENT DOCUMENTS

JP          11-213990 A       8/1999
JP      2004033924 A  *   2/2004
(Continued)

*Primary Examiner* — T. Bennett McKenzie
(74) *Attorney, Agent, or Firm* — Sughrue Mion, PLLC

(57) ABSTRACT

Provided is a method for producing an electrode paste capable of readily and reliably removing bubbles from the produced electrode paste. A method includes a step for performing vacuum-defoaming of bubbles present in an electrode paste (8) by vacuuming the inside of a defoaming tank (6) while introducing the electrode paste (8) to the defoaming tank (6). In the step for performing vacuum-defoaming of bubbles present in an electrode paste (8), a rising velocity (fluid surface rising velocity VL) of the fluid surface of the electrode paste (8) in the defoaming tank (6) is made smaller than a rising velocity (reference bubble rising velocity VGa) of the bubbles in the electrode paste (8) by adjusting a flow rate (supply flow rate Q) of the electrode paste (8) introduced to the defoaming tank (6).

3 Claims, 8 Drawing Sheets

(51) Int. Cl.
*H01M 4/04* (2006.01)
*H01M 4/139* (2010.01)
*H01M 4/20* (2006.01)
*B29B 7/18* (2006.01)
*B29B 7/46* (2006.01)

(52) U.S. Cl.
CPC ........... *H01M 4/04* (2013.01); *H01M 4/0483* (2013.01); *H01M 4/139* (2013.01); *H01M 4/20* (2013.01); *B29B 7/46* (2013.01)

(58) Field of Classification Search
USPC .................................................. 95/241–266
See application file for complete search history.

(56) References Cited

U.S. PATENT DOCUMENTS

| | | |
|---|---|---|
| 2011/0134717 A1 | 6/2011 | Furuichi et al. |
| 2014/0010037 A1 | 1/2014 | Kitayoshi et al. |

FOREIGN PATENT DOCUMENTS

| | | | |
|---|---|---|---|
| JP | 2004033924 A | * | 2/2004 |
| JP | 2011-224435 A | | 11/2011 |
| JP | 2014-17064 A | | 1/2014 |
| WO | 2010018771 A1 | | 2/2010 |

* cited by examiner

METHOD FOR PRODUCING ELECTRODE PASTE

CROSS REFERENCE TO RELATED APPLICATIONS

This application is a National Stage of International Application No. PCT/JP2012/074946 filed Sep. 27, 2012, the contents of all of which are incorporated herein by reference in their entirety.

TECHNICAL FIELD

The present invention relates to techniques on a method for producing an electrode paste.

BACKGROUND ART

Conventionally, there has been a known technique for producing an electrode paste with good quality (i.e., homogeneous paste) using a twin-screw extrusion kneader. For example, the technique is disclosed in Patent Literature 1 described below, and is publicly known.

The conventional technique disclosed in Patent Literature 1 relates to a kneader (i.e., a twin-screw extrusion kneader) including a hollow barrel, and two rotary shafts provided parallel to each other at a predetermined interval in a kneading chamber formed inside the barrel. In the kneading chamber, a binder supply part, to which a binder is supplied, is disposed on the downstream of a powder supply part, to which a powder is supplied, in the conveyance direction of the powder, and a powder processing part having spacers, which are arranged on the rotary shaft and compress the powder, is disposed between the powder supply part and the binder supply part.

By producing an electrode mixture (electrode paste) using such a twin-screw extrusion kneader, it is possible to produce a paste with good quality (i.e., homogeneous paste).

Conventionally, in a case where the electrode paste is produced using the twin-screw extrusion kneader as described in Patent Literature 1, an inside of the twin-screw extrusion kneader is not airtight (i.e., the inside thereof constitutes an open circuit). Accordingly, before the electrode paste discharged from the twin-screw extrusion kneader is introduced to a closed circuit (defoaming tank) for performing vacuum-defoaming, the whole produced electrode paste needs to be temporarily received by the tank and subjected to batch processing.

Therefore, in the case where the electrode paste is produced using the twin-screw extrusion kneader, the time required to produce the paste becomes longer by performing the batch processing. Consequently, in the case where the twin-screw extrusion kneader is used, it is difficult to shorten the time required to produce the electrode paste.

The applicants have disclosed a technique on a system for producing an electrode paste combining a twin-screw extrusion kneader and a mohno-pump in Japanese Patent Application 2012-151920 (unpublished at the time of filing the present application).

By using the system disclosed in this Patent Application 2012-151920, it is not necessary to perform the batch processing on the electrode paste produced by the twin-screw extrusion kneader, and it is possible to continuously perform vacuum-defoaming in a pipe through which the electrode paste is conveyed to the defoaming tank, thereby shortening the time required to produce the electrode paste.

CITATION LIST

Patent Literature

Patent Literature 1: JP-A 2011-224435

SUMMARY OF INVENTION

Problem to be Solved by the Invention

The electrode paste produced in the system disclosed in Japanese Patent Application 2012-151920 is then subjected to defoaming in the defoaming tank.

However, the defoaming may take time depending on the defoaming method on the electrode paste. Even when using the system disclosed in Japanese Patent Application 2012-151920, there is a problem in that the time required to produce the electrode paste cannot be desirably shortened.

Further, bubbles present in the electrode paste cannot be sufficiently removed depending on the defoaming method. Since the electrode paste excluding a portion including bubbles is used, there is also a problem in that yield of the electrode paste cannot be desirably improved.

In consideration of these present problems, the object of the present invention is to provide a method for producing an electrode paste capable of readily and reliably removing bubbles from the produced electrode paste.

Means for Solving the Problem

The problems to be solved by the present invention are as described above, and the means for solving the problems are described below.

A first aspect of the invention is a a method for producing an electrode paste, including a step for performing vacuum-defoaming of bubbles present in the electrode paste by vacuuming an inside of a defoaming tank while introducing the electrode paste to the defoaming tank. In the step for performing the vacuum-defoaming of the bubbles present in the electrode paste, a rising velocity of a fluid surface of the electrode paste in the defoaming tank is made smaller than a rising velocity of the bubbles in the electrode paste by adjusting a flow rate of the electrode paste introduced to the defoaming tank.

A second aspect of the invention is the method, in which the step for performing the vacuum-defoaming of the bubbles present in the electrode paste is performed using a system for producing the electrode paste, the system including a twin-screw extrusion kneader and a mohno-pump. The step for performing the vacuum-defoaming of the bubbles present in the electrode paste includes connecting a discharge port of the twin-screw extrusion kneader and an inlet of the mohno-pump. The step includes connecting an outlet of the mohno-pump to the defoaming tank. The step includes connecting an inlet of a vacuum pump to the defoaming tank. The step includes forming a pipe system on the defoaming tank side of an airtight line as a closed circuit, the airtight line being formed as a boundary at a contact part between a rotor and a stator in the mohno-pump. The step includes performing the vacuum-defoaming of the electrode paste continuously inside the pipe system on the defoaming tank side of the airtight line and inside the defoaming tank by conveying the electrode paste to the defoaming tank with the mohno-pump while maintaining the pipe system on the defoaming tank side of the airtight line in a vacuum state by vacuuming the defoaming tank with the vacuum pump.

A third aspect of the invention is the method, in which the mohno-pump is configured so that a connecting port on a side far from a shaft seal part of a motor shaft with which the mohno-pump is provided acts as the inlet, and a connecting port on a side near the shaft seal part of the motor shaft acts as the outlet.

Effects of the Invention

The following advantageous effects can be acquired as advantageous effects of the present invention.

The first and second aspects of the present invention can reliably remove bubbles present in an electrode paste.

The third aspect of the present invention can more reliably remove the bubbles present in the electrode paste by a system for producing the electrode paste having a simple configuration.

BRIEF DESCRIPTION OF DRAWINGS

FIGS. 6A and 6B show a state where bubbles present in the electrode paste is removed in the system according to one embodiment of the present invention, in which FIG. 6A is a schematic cross-sectional view showing a state where the electrode paste is introduced to a defoaming tank, and FIG. 6B is a schematic view for explaining a relationship between a rising velocity of the fluid surface of the electrode paste and a rising velocity of the bubbles present in the electrode paste.

DESCRIPTION OF EMBODIMENTS

Embodiments of the present invention are described.

First, an overall configuration of a system for producing an electrode paste according to a first embodiment of the present invention will be described with reference to FIGS. 1 to 5.

Figure 1:
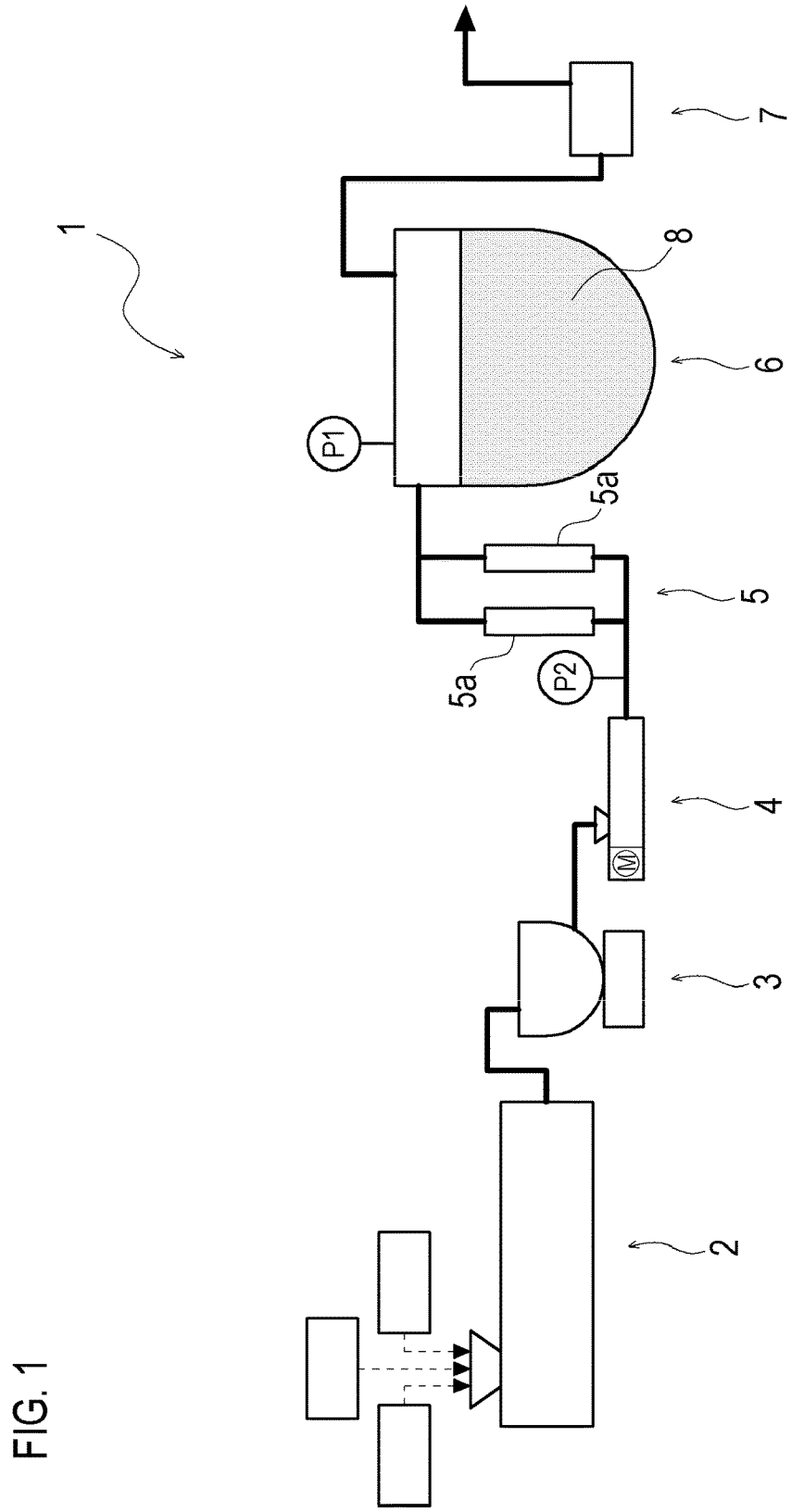
FIG. 1 is a schematic view showing an overall configuration of a system for producing an electrode paste according to a first embodiment of the present invention.

As shown in FIG. 1, a system 1 according to the first embodiment of the present invention is a system for producing an electrode paste 8, and includes a twin-screw extrusion kneader 2, a buffer tank 3, a mohno-pump 4, a defoaming tank 6, and a vacuum pump 7.

A method for producing the electrode paste according to the present invention can be realized by producing the electrode paste 8 using the system 1.

The twin-screw extrusion kneader 2 is a device used to knead plural kinds of powders or liquids. The twin-screw extrusion kneader 2 includes a hollow barrel (not shown) and two rotary shafts (not shown) provided parallel to each other at a predetermined interval in a kneading chamber (not shown) formed inside the barrel.

Then, in the twin-screw extrusion kneader 2, powders (active material and thickener) and a liquid (solvent) are supplied to the kneading chamber, and the powders and the liquid are conveyed while being, for example, compressed. Further, additional liquid (solvent) and powder (binder) are supplied to the kneading chamber during the kneading, and the powder and the liquid are conveyed while being, for example, further compressed. The powders and the liquids are kneaded to produce the electrode paste 8 (see FIG. 3).

The buffer tank 3 is a tank for temporarily storing the electrode paste 8 produced in the twin-screw extrusion kneader 2 before being introduced to the mohno-pump 4. The buffer tank 3 plays a role of absorbing changes in a discharge amount of the electrode paste 8 discharged from the twin-screw extrusion kneader 2.

Therefore, in a case where the discharge amount of the electrode paste 8 from the twin-screw extrusion kneader 2 and a supply amount of the electrode paste 8 by the mohno-pump 4 are, for example, controlled so as to conform to each other, the buffer tank 3 can be omitted.

The mohno-pump 4 is a pump classified as a rotary positive displacement type uniaxial eccentric screw pump and used as a means for conveying the electrode paste 8 produced in the twin-screw extrusion kneader 2 to the defoaming tank 6.

Figure 2:
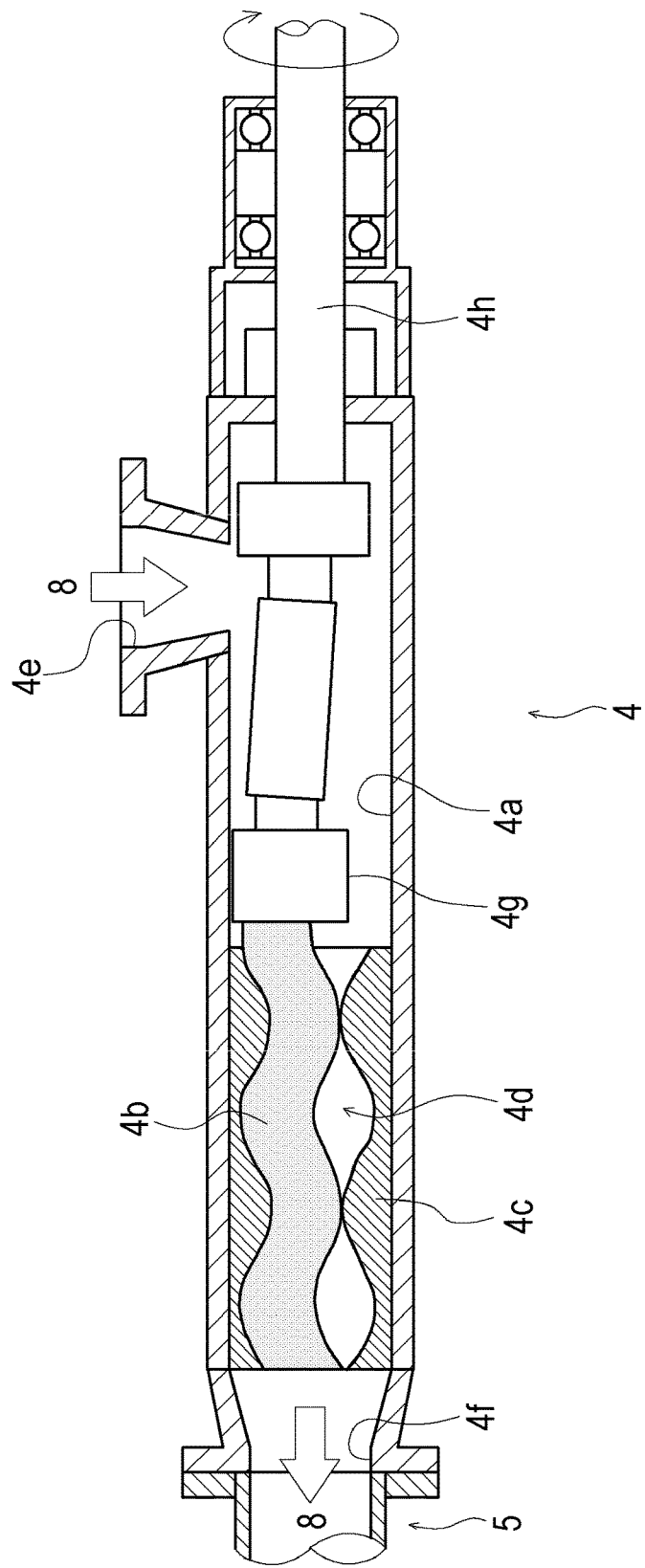
FIG. 2 is a schematic view showing a mohno-pump provided in the system according to the present invention.

As shown in FIG. 2, the mohno-pump 4 is a pump with a structure where a rotor 4b and a stator 4c are provided inside a casing 4a.

The rotor 4b is a metal rod-like body which is substantially spirally bent with a predetermined twisting angle and whose cross-sectional shape is a perfect circle at any place.

Further, the stator 4c is a member provided with a void part for receiving the rotor 4b and formed of a material (e.g., EPDM) having elasticity.

Then, when the rotor 4b is inserted into the void part of the stator 4c, a spiral gap sealed by tangents is formed between the stator 4c and the rotor 4b, and this gap forms a plurality of independent cavities 4d serving as airtight spaces.

Also, in other words, in the mohno-pump 4, an airtight line securing air tightness on a primary side and a secondary side of the mohno-pump 4 is formed in a region where the rotor 4b and the stator 4c are brought into contact with each other.

Further, the casing 4a of the mohno-pump 4 includes an inlet 4e for introducing the electrode paste 8 toward an inside of the casing 4a and an outlet 4f for discharging the electrode paste 8 from the casing 4a.

Then, as shown in FIG. 1, in the mohno-pump 4, the inlet 4e side is connected to the buffer tank 3 and the outlet 4f side is connected to the defoaming tank 6 by a pipe 5.

Further, filters 5a, 5a for removing any foreign matter present in the electrode paste 8 are provided on the pipe 5.

Further, as shown in FIG. 2, in the mohno-pump 4, the rotor 4b is coupled to a rotary shaft 4h fixedly provided at a shaft of a motor (not shown) via a universal joint 4g. By operating the motor, the rotor 4b can be rotated inside the stator 4c.

Then, when the rotor 4b is rotated inside the stator 4c, the electrode paste 8 introduced to the inside of the casing 4a from the inlet 4e is sucked into the cavity 4d on an uppermost stream side (whose end part is opened) in a conveyance direction. Further, when the rotor 4b is rotated inside the stator 4c, the cavities 4d are moved to the outlet 4f side of the mohno-pump 4.

In other words, in the mohno-pump 4, the electrode paste 8 sucked into the cavities 4d is continuously conveyed in a direction of the outlet 4f and eventually discharged from the outlet 4f.

It should be noted that in the mohno-pump 4, by inverting a rotation direction of the motor (not shown), it is possible that the inlet 4e side thereof is used as an outlet and the outlet 4f side thereof is used as an inlet.

In the mohno-pump 4 are formed the plurality of independent cavities 4d as the gap between the rotor 4b and the stator 4c. Between the cavities 4d, air tightness is secured at a position where the rotor 4b and stator 4c come in contact with each other (tangent position).

Figure 4:
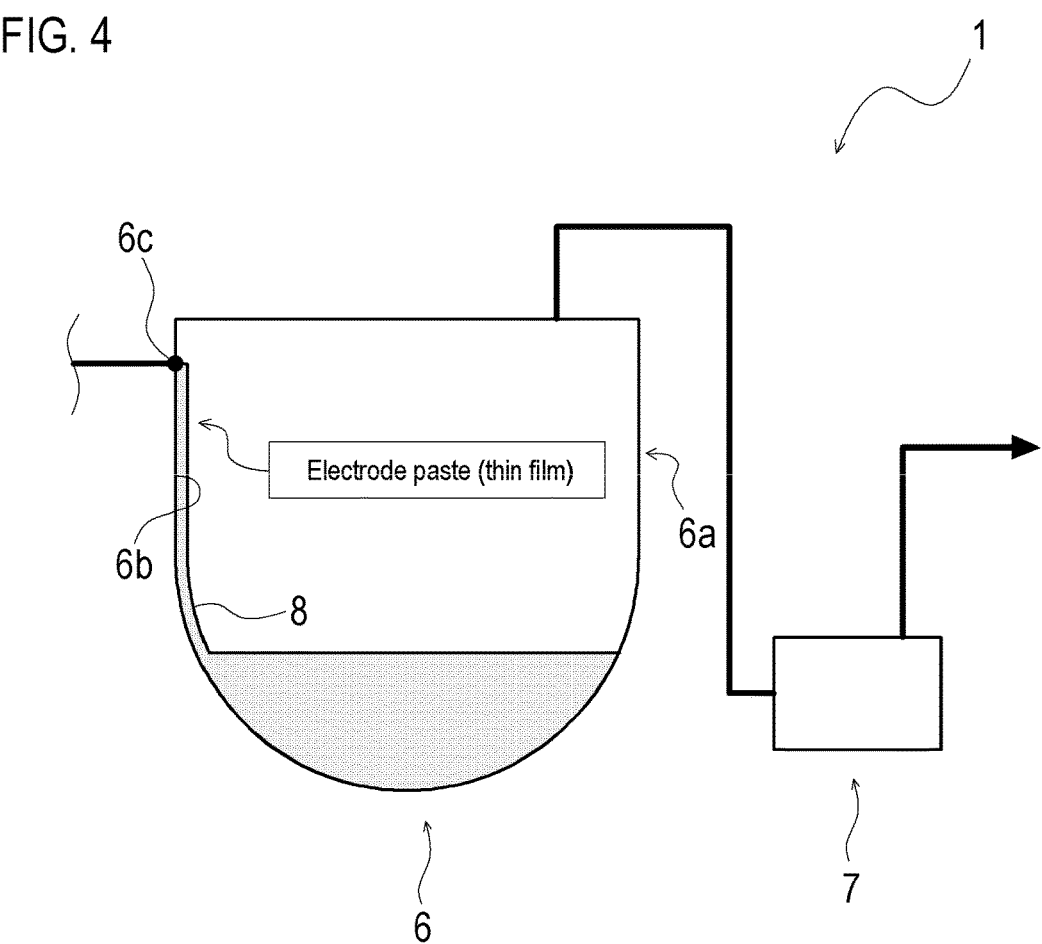
FIG. 4 is a schematic view showing a state of defoaming in the system according to the first embodiment of the present invention.

Therefore, in the system 1, the airtight line in the mohno-pump 4 (i.e., the position where the rotor 4b and the stator 4c come in contact with each other) acts as a boundary, thus enabling to form a pipe system on a primary side of the airtight line as an open circuit connecting the twin-screw extrusion kneader 2 and the buffer tank 3, and to form a pipe system on a secondary side of the airtight line as a closed circuit while As shown in FIG. 4, the defoaming tank 6 is a container for storing the electrode paste 8, and is a device for removing bubbles by decompressing (e.g., approximately −90 kPa) an inside of the defoaming tank 6, causing bubbles mixed in the electrode paste 8 to expand, and thereby causing the bubbles to float and break.

Further, the vacuum pump 7 is connected to the defoaming tank 6 and is a device for vacuuming an inside of the defoaming tank 6. The vacuum pump 7 has a capability of causing the degree of vacuum inside the defoaming tank 6 to reach approximately −90 kPa.

Further, in the system 1, since a path in the pipe from the defoaming tank 6 to the mohno-pump 4 is a closed circuit, a degree of vacuum (pressure P1 shown in FIG. 1) of the filters 5a, 5a on the secondary side can be set to approximately −90 kPa, and a degree of vacuum (pressure P2 shown in FIG. 1) of the filters 5a, 5a on the primary side can be set to approximately −35 kPa.

Figure 5:
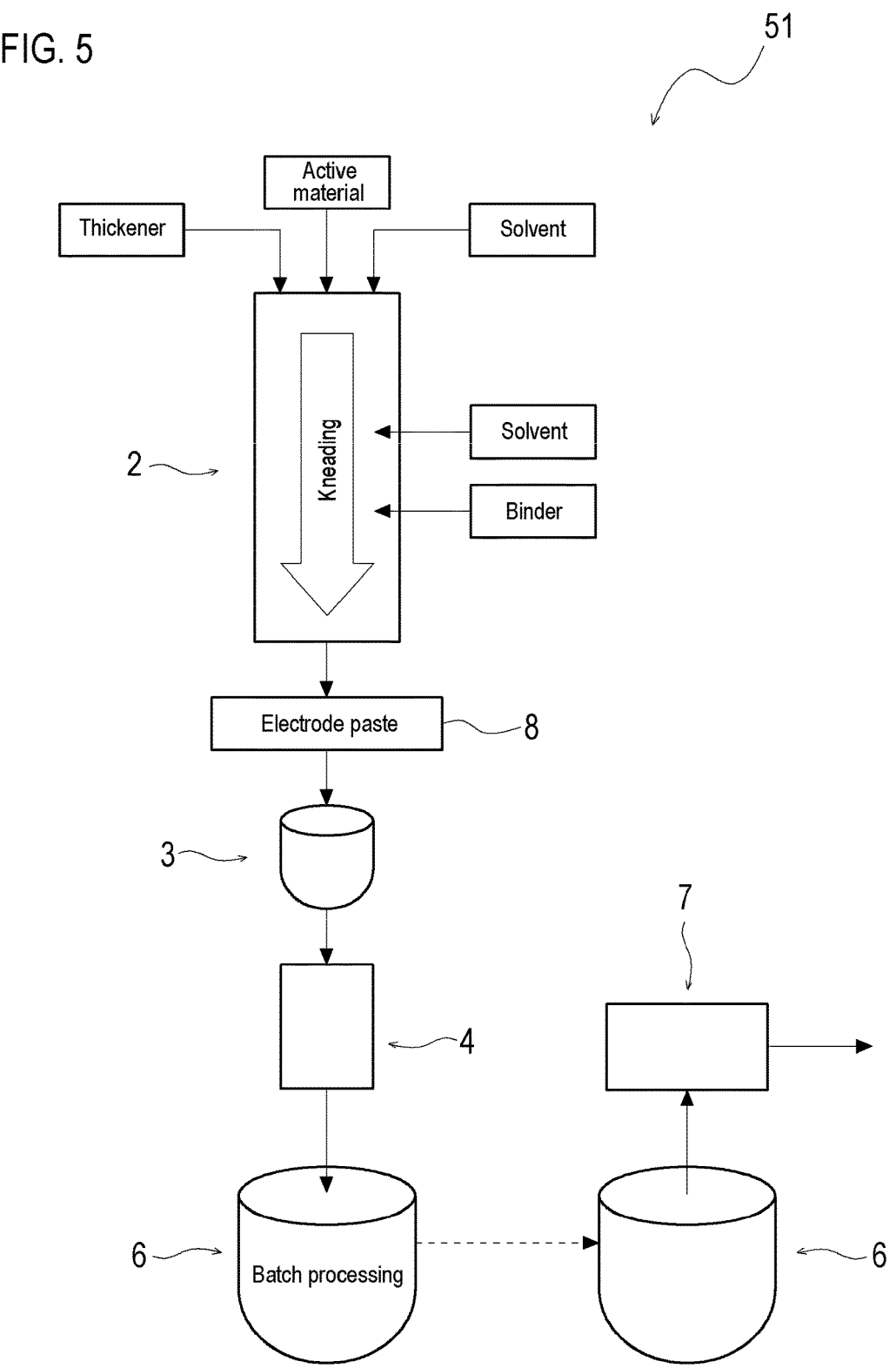
FIG. 5 is a schematic view showing a flow of a step for producing an electrode paste in a case of using a conventional system.

As shown in FIG. 5, in a case where a conventional system 51 for producing an electrode paste is used, an electrode paste 8 produced in a twin-screw extrusion kneader 2 is received by a buffer tank 3 and conveyed from the buffer tank 3 to a defoaming tank 6 by a mohno-pump 4.

In this manner, when the produced electrode paste 8 is conveyed to the defoaming tank 6 by the mohno-pump 4, after the whole amount of the electrode paste 8 is temporarily stored in the defoaming tank 6 (i.e., after batch processing), an inside of the defoaming tank 6 is vacuumed by a vacuum pump 7 to perform vacuum-defoaming to the electrode paste 8 for removal of bubbles.

Figure 3:
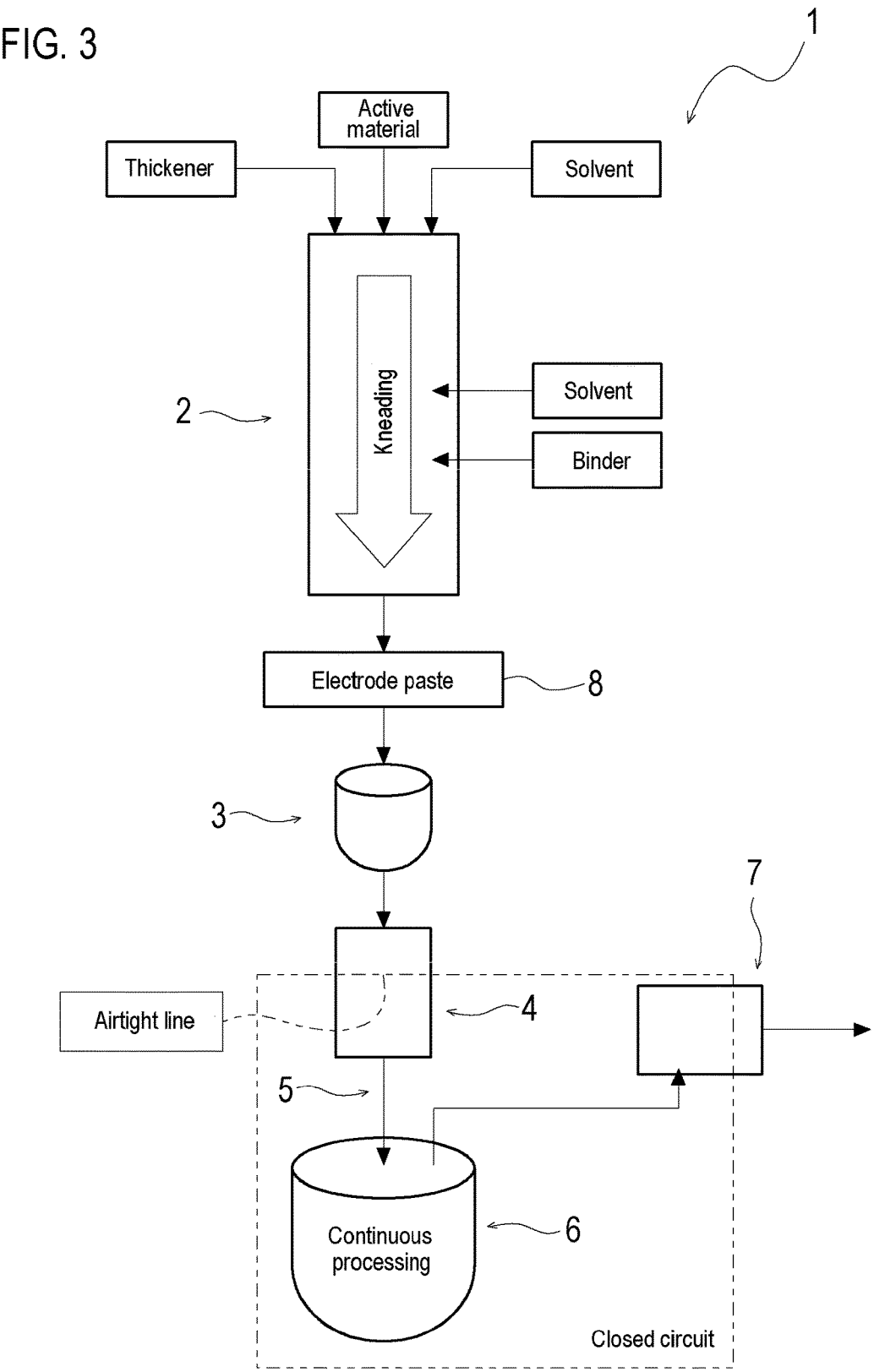
FIG. 3 is a schematic view showing a flow of a step for producing an electrode paste in a case of using the system according to the present invention.

On the other hand, as shown in FIG. 3, in a case where the system 1 is used, since the pipe system on the secondary side of the airtight line in the mohno-pump 4 is the closed circuit, the electrode paste 8 conveyed to the defoaming tank 6 can be continuously subjected to the vacuum-defoaming without batch processing on the path (pipe 5) from the mohno-pump 4 to the defoaming tank 6.

Further, as shown in FIG. 4, in the defoaming tank 6 is formed an introduction port 6c which acts as an opening part for introducing the electrode paste 8 to the defoaming tank 6 and communicates with the pipe 5.

Then, the introduction port 6c is formed on an upper side of a barrel part 6a serving as a substantially cylindrical part of the defoaming tank 6. The electrode paste 8 introduced from the introduction port 6c to the inside of the defoaming tank 6 flows downward along an inner wall surface 6b of the barrel part 6a serving as a vertical inner wall surface and is stored in a bottom part 6d.

It should be noted that "upper side" referred herein is a concept including a region above the barrel part 6a and an upper part of the barrel part 6a. Any position is acceptable as long as the electrode paste 8 introduced from the introduction port 6c to the inside of the defoaming tank 6 can be flowed down along the inner wall surface 6b.

Next, a method for removing bubbles present in the electrode paste in the method for producing the electrode paste according to one embodiment of the present invention will be explained with reference to FIGS. 6(a) and 6(b).

Figure 6A:
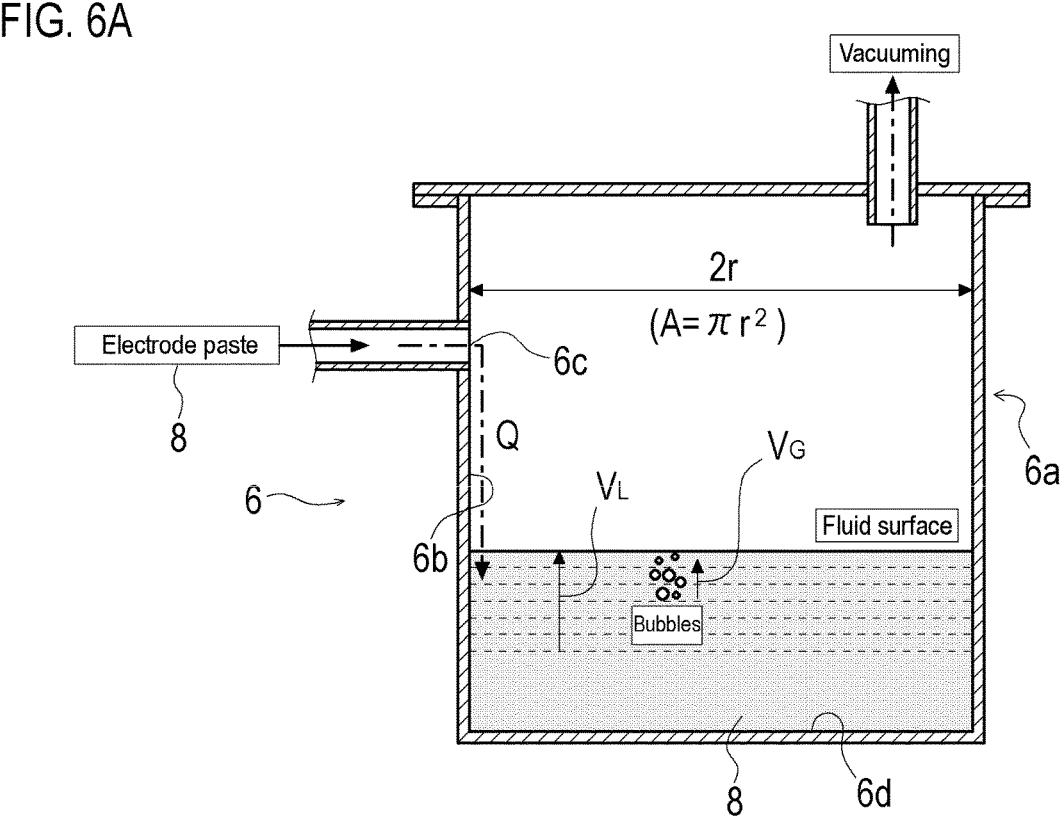

As shown in FIG. 6(a), the electrode paste 8 introduced from the introduction port 6c to the defoaming tank 6 flows down on the inner wall surface 6b of the barrel part 6a and is stored in the bottom part 6d of the defoaming tank 6.

At this time, a fluid surface of the electrode paste 8 stored in the bottom part 6d of the defoaming tank 6 rises at a predetermined velocity according to a flow rate (hereinafter, described as a supply flow rate Q) of the electrode paste 8 supplied from the introduction port 6c.

It should be noted that a rising velocity of the fluid surface of the electrode paste 8 will be hereinafter referred to as a fluid surface rising velocity $V_L$. When a cross-sectional area of an internal space of the barrel part 6a of the defoaming tank 6 is A, the fluid surface rising velocity $V_L$ can be obtained from the equation 1 shown below.

$$V_L = \frac{Q}{A} \qquad \text{[Mathematical 1]}$$

The electrode paste 8 supplied per unit time forms on the fluid surface a thin film having a predetermined thickness corresponding to the supply flow rate Q.

In a case where bubbles are mixed in a paste having a greater specific gravity, such as the electrode paste 8, since the density difference is large under the decompression environment and the paste immediately after supplied and the paste, from which the bubbles have been removed, are separated into two layers, the thin film is stably formed.

Then, the bubbles present in the electrode paste 8 configuring the thin film rise toward the fluid surface at the predetermined velocity.

It should be noted that a rising velocity of the bubbles in the electrode paste 8 will be hereinafter referred to as a bubble rising velocity $V_G$.

In the thin film having a thickness T, when a time required for the bubbles to rise from a lowermost part to an uppermost part is t, the bubble rising velocity $V_G$ is expressed as $V_G = T/t$.

Then, based on a Stokes' equation, the bubble rising velocity $V_G$ can be calculated by the equation 2 shown below.

It should be noted that r shown in the equation 2 is the radius of the bubbles, and further in the equation 2, $\rho_L$ is the density of the electrode paste 8, $\rho_G$ is the density of the bubble, and $\eta$ is the viscosity of the electrode paste 8.

$$V_G = \frac{T}{t} = \frac{2}{9} r^2 g (\rho_L - \rho_G) / \eta \qquad \text{[Mathematical 2]}$$

Further, in the method for producing the electrode paste according to the present embodiment, the minimum value of the radius r of the bubbles to be removed from the electrode paste 8 is defined as a reference radius $r_a$.

In other words, in the electrode paste 8 shown in the present embodiment, the bubbles having a radius equal to or larger than the reference radius $r_a$ should be removed, and the bubbles having a radius smaller than the reference radius $r_a$ are permitted to exist.

In the method for producing the electrode paste according to the one embodiment of the present invention, the fluid surface rising velocity $V_L$ is smaller than a bubble rising velocity $V_G$ (hereinafter, referred to as a reference bubble rising velocity $V_{Ga}$) of the bubbles having the reference radius $r_a$ (i.e., the fluid surface rising velocity $V_L$<the reference bubble rising velocity $V_{Ga}$).

Specifically, in the method for producing the electrode paste according to the one embodiment of the present invention, in order to make the fluid surface rising velocity $V_L$ smaller than the reference bubble rising velocity $V_{Ga}$, the rotation speed of the motor in the mohno-pump 4 is inverter-controlled, and the supply flow rate Q of the electrode paste 8 to the defoaming tank 6 is adjusted.

Figure 6B:
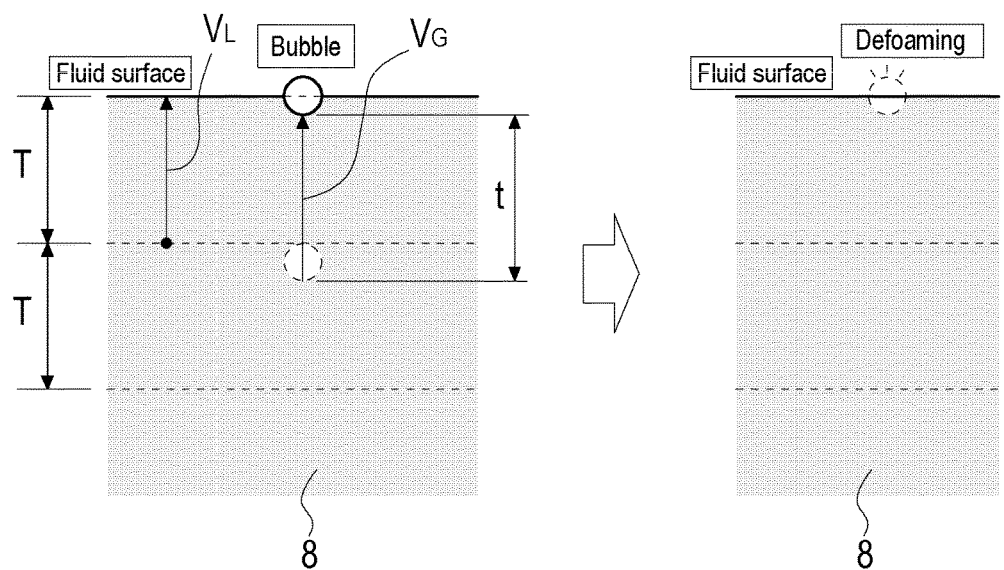

As shown in FIG. 6(b), when the fluid surface rising velocity $V_L$ is smaller than the reference bubble rising velocity $V_{Ga}$, the bubbles present in the electrode paste 8 can be caused to float to a gas-liquid interface before a subsequent thin film of the electrode paste 8 is formed on the stored electrode paste 8.

On the gas-liquid interface, the bubbles floated to the gas-liquid interface and appeared on the fluid surface expand to a size which cannot be maintained by surface tension of a surfactant and are readily and reliably broken. Accordingly, the bubbles present in the electrode paste 8 having a size equal to or larger than the reference radius $r_a$ are reliably removed from the electrode paste 8.

It should be noted that since the electrode paste 8 introduced to the defoaming tank 6 flows down while forming a thin film on the inner wall surface 6b of the barrel part 6a, bubble breaking is promoted even on the thin film on the inner wall surface 6b placed in the decompression state, and the bubbles are removed from the electrode paste 8 even before the electrode paste 8 is stored in the bottom part 6d of the defoaming tank 6.

It should be noted that in the present embodiment, the defoaming tank 6 shown in FIG. 6(a) is an example of a case where the cross-sectional area of the barrel part 6a in a horizontal cross-section is constant. However, the shape of the defoaming tank 6 used in the method for producing the electrode paste according to the present embodiment is not limited to this. For example, the defoaming tank 6 may have an bowl-shaped bottom part shown in FIGS. 1, 3, and 4 and have a shape in which the cross-sectional area of the barrel part 6a is not constant.

In a case where such defoaming tank 6 in which the cross-sectional area is not constant is used, it is also possible that a relationship between the fluid surface height and the cross-sectional area is acquired in advance, the fluid surface height of the electrode paste 8 introduced to the defoaming tank 6 is detected by a fluid surface sensor (not shown) or the like, and the supply flow rate Q of the electrode paste 8 is controlled according to the fluid surface height.

Then, the fluid surface rising velocity $V_L$ may be maintained to a large value compared to the reference bubble rising velocity $V_{Ga}$ by controlling the supply flow rate Q of the electrode paste 8 according to the fluid surface height.

It should be noted that the present embodiment illustrates a case where the means for supplying the electrode paste 8 to the defoaming tank 6 is the mohno-pump 4. However, the configuration of the means for supplying the electrode paste 8 in the system 1 according to the present embodiment is not limited to this.

The means for supplying the electrode paste 8 in the system 1 according to the present embodiment, for example, may have a configuration which increases the degree of vacuum inside the defoaming tank 6 and sucks the electrode paste 8 stored in the buffer tank 3 to introduce it to the inside of the defoaming tank 6.

Further, in this case, it is possible that a flow rate adjusting valve is provided in the pipe for introducing the electrode paste 8 to the inside of the defoaming tank 6, and the supply flow rate Q of the electrode paste 8 introduced to the inside of the defoaming tank 6 is adjusted by adjusting the opening degree of the flow rate adjusting valve and the degree of vacuum inside the defoaming tank 6.

The method for producing the electrode paste according to the one embodiment of the present invention includes the step for performing the vacuum-defoaming of bubbles present in the electrode paste 8 by vacuuming the inside of the defoaming tank 6 while introducing the electrode paste 8 to the defoaming tank 6. In the step for performing the vacuum-defoaming of bubbles present in the electrode paste 8, the rising velocity (fluid surface rising velocity $V_L$) of the fluid surface of the electrode paste 8 in the defoaming tank 6 is made smaller than the rising velocity (reference bubble rising velocity $V_{Ga}$) of the bubbles in the electrode paste 8 by adjusting the flow rate (supply flow rate Q) of the electrode paste 8 introduced to the defoaming tank 6.

In the method for producing the electrode paste according to the one embodiment of the present invention, the step for performing the vacuum-defoaming of the bubbles present in the electrode paste 8 is performed using the system 1 including the twin-screw extrusion kneader 2 and the mohno-pump 4. The step includes connecting the discharge port of the twin-screw extrusion kneader 2 and the inlet 4e of the mohno-pump 4. The step includes connecting the outlet 4f of the mohno-pump 4 to the defoaming tank 6. The step includes connecting the inlet of the vacuum pump 7 to the defoaming tank 6. The step includes forming the pipe system (pipe 5) on the defoaming tank 6 side of the airtight line as the closed circuit, the airtight line being formed as the boundary at the contact part between the rotor 4b and the stator 4c in the mohno-pump 4. The step includes performing the vacuum-defoaming of the electrode paste 8 continuously inside the pipe system (pipe 5) on the defoaming tank 6 side of the airtight line and inside the defoaming tank 6 by conveying the electrode paste 8 to the defoaming tank 6 with the mohno-pump 4 while maintaining the pipe system (pipe 5) on the defoaming tank 6 side of the airtight line in the vacuum state by vacuuming the defoaming tank 6 with the vacuum pump 7.

This makes it possible to reliably remove the bubbles present in the electrode paste 8.

Next, a configuration of a system for producing an electrode paste according to a second embodiment of the present invention will be described with reference to FIGS. 7 and 8.

Figure 7:
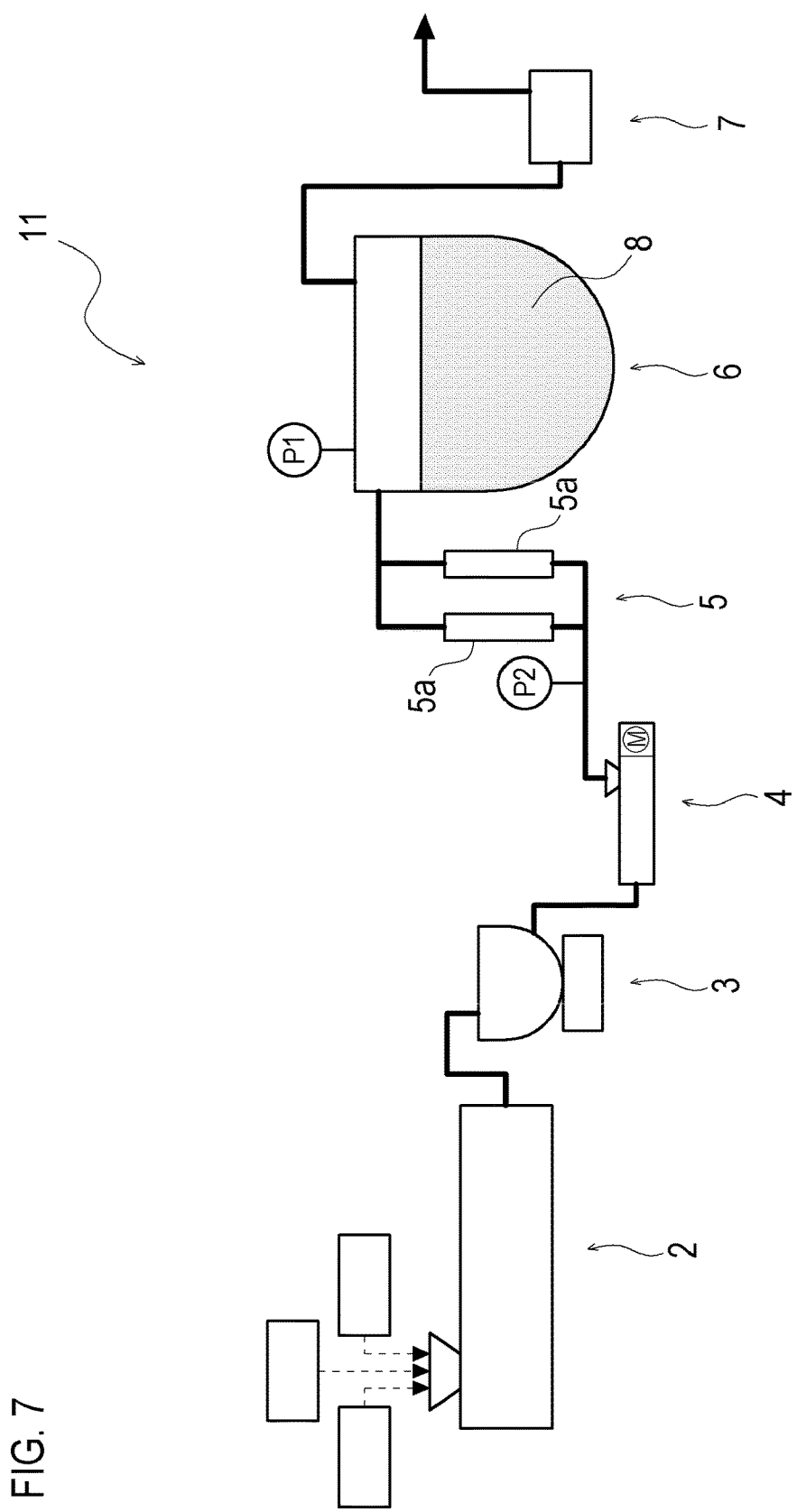
FIG. 7 is a schematic view showing an overall configuration of a system for producing the electrode paste according to a second embodiment of the present invention.
Figure 8:
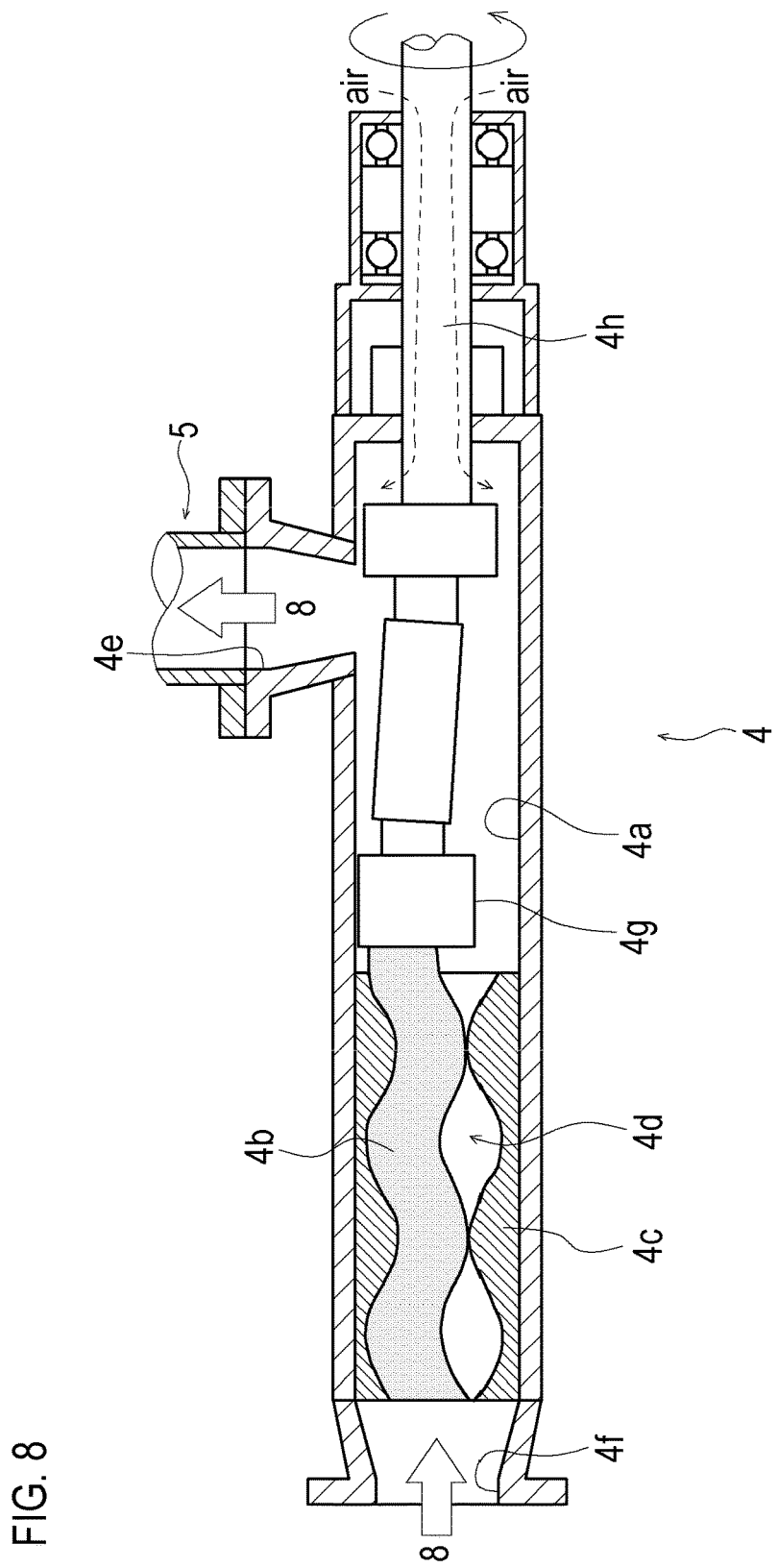
FIG. 8 is a schematic view showing a state where a mohno-pump in the system according to the second embodiment of the present invention is arranged.

As shown in FIGS. 7 and 8, in a system 11 according to the second embodiment of the present invention, the mohno-pump 4 is connected in an opposite direction to the system 1 according to the first embodiment of the present invention.

In other words, one connection port of the mohno-pump 4 used as the inlet 4e in the system 1 is arranged on the downstream side in the conveyance direction of the electrode paste 8 (i.e., used as an outlet), and another connection port of the mohno-pump 4 used as the outlet 4f therein is arranged on the upstream side in the conveyance direction of the electrode paste 8 (i.e., used as an inlet).

Then, since the mohno-pump 4 is arranged in this manner and the rotation direction of a motor (not shown) is set in an opposite direction, while the electrode paste 8 is conveyed by the mohno-pump 4, an inside of a casing 4a of the mohno-pump 4 on the motor (not shown) side can be vacuumed, and further, air can be introduced to the inside of the casing 4a from a shaft seal part of a rotary shaft 4h.

When the air is introduced to the inside of the vacuumed pipe 5, the electrode paste 8 supplied to the inside of the defoaming tank 6 can be urged and scattered by the air flowing inside the pipe 5, and bubbles floating on a fluid surface can be broken more reliably by causing the scattered electrode paste 8 to collide with the fluid surface of the electrode paste 8 stored in a bottom part 6d of the defoaming tank 6.

In order to introduce air for promoting bubble breaking inside the defoaming tank 6, it is possible to employ a configuration using a valve or the like for introducing the air to the pipe 5. However, in the system 11, the air can be easily introduced without separately providing the valve or the like only by arranging the mohno-pump 4 in the opposite direction.

In the method for producing the electrode paste according to the one embodiment of the present invention, the mohno-pump 4 is configured so that the connecting port (outlet 4f) on the side far from the shaft seal part of the motor shaft with which the mohno-pump 4 is provided acts as the inlet, and the connecting port (inlet 4e) on the side near the shaft seal part of the motor shaft acts as the inlet.

This makes it possible to more reliably remove the bubbles present in the electrode paste 8 with the system 11 having a simple configuration.

Next, an electrode paste produced by using the system 1 or 11 according to the respective embodiments of the present invention will be described.

In the electrode paste 8 produced by using the system 1 or 11 described above, since the bubbles present in the electrode paste 8 are reliably removed compared to a conventional one, a defect (transparency) occurring when the electrode paste 8 is applied to a metallic foil is reduced.

Therefore, a secondary battery is produced with the electrode paste 8 produced by using the system 1 or 11, thus enabling to reduce an internal defect of the secondary battery, which can contribute to the quality improvement, such as the reliability improvement, of the secondary battery.

Further, in the electrode paste 8 produced by using the system 1 or 11, the bubbles are removed over the whole electrode paste 8 in a state of being stored inside the defoaming tank 6, and the whole produced electrode paste 8 can be used without requiring removal of a supernatant. Accordingly, yield of the electrode paste 8 is improved compared to the conventional one.

Therefore, producing the secondary battery with the electrode paste 8 produced by using the system 1 or 11 can contribute to cost reduction of the secondary battery.

The secondary battery according to the one embodiment of the present invention is produced by using the electrode paste 8 produced by the method for producing the electrode paste according to the one embodiment of the present invention.

In this manner, the electrode body with few defects, such as a transparency, and of good quality can be produced by using the electrode paste 8 from which the bubbles have been reliably removed, which can contribute to the improvement of performance of the secondary battery.

INDUSTRIAL APPLICABILITY

The present invention is widely applicable not only to the electrode paste for producing the secondary battery but also to a method for producing a paste which requires removal of bubbles in the paste. For example, the present invention is applicable to techniques for producing pasty foods, chemicals, medicines or the like.

REFERENCE SIGNS LIST

1: system for producing electrode paste
2: twin-screw extrusion kneader
4: mohno-pump
6: defoaming tank
7: vacuum pump
8: electrode paste

The invention claimed is:

1. A method for producing an electrode paste, comprising:
performing vacuum-defoaming of bubbles present in the electrode paste by vacuuming an inside of a defoaming tank while introducing the electrode paste to the defoaming tank, wherein
when performing the vacuum-defoaming of the bubbles present in the electrode paste, a rising velocity of a fluid surface of the electrode paste in the defoaming tank is made smaller than a rising velocity of the bubbles in the electrode paste by adjusting a flow rate of the electrode paste introduced to the defoaming tank whereby the bubbles present in the electrode paste are caused to float to a gas-liquid interface before a subsequent upper layer of the electrode paste which is formed below the gas-liquid interface within the tank is formed on the stored electrode paste.

2. The method according to claim 1, wherein
when performing the vacuum-defoaming of the bubbles present in the electrode paste is performed using a system for producing the electrode paste, the system including a twin-screw extrusion kneader and a mohno-pump, and
performing the vacuum-defoaming of the bubbles present in the electrode paste includes:
connecting a discharge port of the twin-screw extrusion kneader and an inlet of the mohno-pump;
connecting an outlet of the mohno-pump to the defoaming tank;
connecting an inlet of a vacuum pump to the defoaming tank;
forming a pipe system on the defoaming tank side of an airtight line as a closed circuit, the airtight line being formed as a boundary at a contact part between a rotor and a stator in the mohno-pump; and
performing the vacuum-defoaming of the electrode paste continuously inside the pipe system on the defoaming tank side of the airtight line and inside the defoaming tank by conveying the electrode paste to the defoaming tank with the mohno-pump while maintaining the pipe system on the defoaming tank side of the airtight line in a vacuum state by vacuuming the defoaming tank with the vacuum pump.

3. The method according to claim 2, wherein
the mohno-pump is configured so that a connecting port on a side far from a shaft seal part of a motor shaft with which the mohno-pump is provided acts as the inlet, and a connecting port on a side near the shaft seal part of the motor shaft acts as the outlet.

* * * * *